United States Patent [19]

Humes et al.

[11] 4,223,868
[45] Sep. 23, 1980

[54] RESILIENT SEATED GATE VALVE

[75] Inventors: Dennis W. Humes; Joseph L. Daghe, both of Decatur, Ill.

[73] Assignee: Mueller Co., Decatur, Ill.

[21] Appl. No.: 28,918

[22] Filed: Apr. 10, 1979

[51] Int. Cl.³ .......................... F16K 3/314; F16K 3/12
[52] U.S. Cl. ...................................... 251/326; 251/328
[58] Field of Search ......................... 251/326, 327, 328

[56] References Cited

U.S. PATENT DOCUMENTS

| 3,662,778 | 5/1972 | Leopold, Jr. et al. | 251/326 X |
| 3,957,245 | 5/1976 | Daghe | 251/326 X |
| 3,963,214 | 6/1976 | Hackman et al. | 251/326 |

FOREIGN PATENT DOCUMENTS

| 1163626 | 2/1964 | Fed. Rep. of Germany | 251/327 |
| 1922516 | 11/1969 | Fed. Rep. of Germany | 251/326 |
| 1600753 | 1/1970 | Fed. Rep. of Germany | 251/326 |

*Primary Examiner*—Arnold Rosenthal
*Attorney, Agent, or Firm*—Cushman, Darby & Cushman

[57] ABSTRACT

A gate valve structure for use in large diameter mains carrying fluids under high pressure, the gate valve structure being provided with an improved annular resilient seal for engaging a valve seat of the type where the valve seat provides for a face-seal and an edge-seal with intermediate sections making both a face-seal and an edge-seal. The annular resilient seal member is provided with a pair of arcuate bulges oppositely disposed thereon at positions to engage the face-seat surface of the valve seat adjacent the face-seat surface's minimum radial thicknesses to provide an increased contact in this area when the gate member is in the closed position. Additionally, the improved gate valve structure utilizes opposed ribs in the elongated chamber of the casing, the ribs being received in guideways or recesses in the periphery of the gate member so as to guide the gate member during opening and closing. Such an arrangement permits the use of smaller and lighter valve casings for large diameter mains.

11 Claims, 15 Drawing Figures

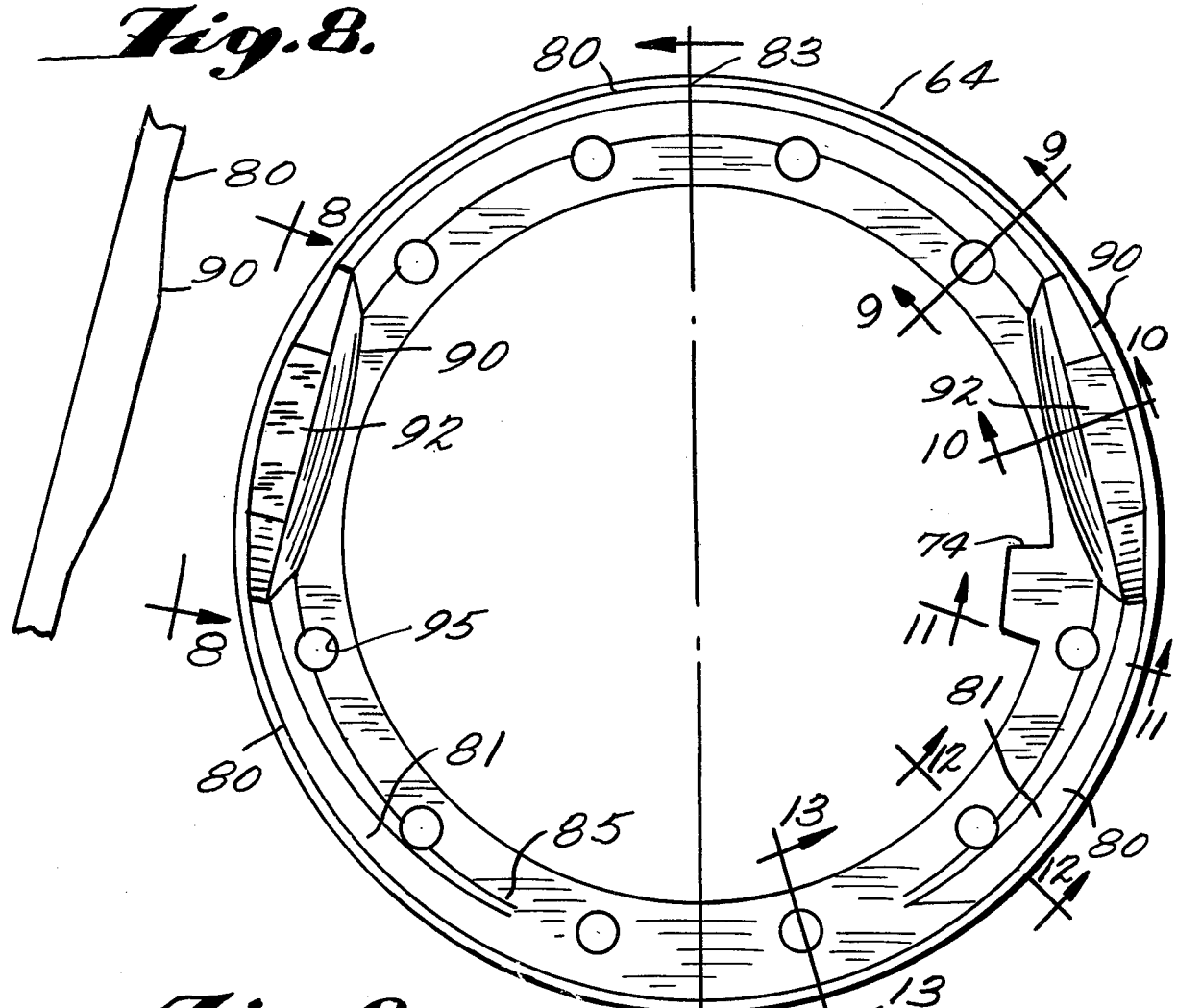

RESILIENT SEATED GATE VALVE

The present invention relates to an improved gate valve structure and, more particularly, to a gate valve structure which is an improvement over that disclosed in the U.S. patent application of Daniel A. Ellis, Ser. No. 798,686, filed May 19, 1977, now U.S. Pat. No. 4,162,058, and commonly assigned to Mueller Co., Decatur, Ill. The present invention permits the construction of gate valve structures such as disclosed in the aformentioned application which may be used with large diameter mains carrying fluids under high pressure. The gate valve structure includes a valve casing having a machined valve seat surrounding one of the ports of its through-bore, the machined valve seat having an upper portion for making a face-seal with a resilient seal member of a gate member, a lower portion for making an edge-seal with the seal member and intermediate oppositely disposed portions connecting the ends of the upper portion with the respective ends of the lower portion for making a combination face and edge-seal with the seal member. The improved annular resilient seal member provides additional material in the form of oppositely disposed bulges at positions thereon to engage the upper planar seat portion adjacent its minimal radial thickness. This provides increased contact area of the resilient seal member to thereby obviate any leakage at the locations mentioned.

BACKGROUND OF THE INVENTION

In the aforementioned application Ser. No. 798,686, there is disclosed a gate valve structure primarily utilized in mains carrying fluid under pressure, such as mains in a water distribution system, although it may be used in systems carrying other fluids. The valve seat surrounding one of the ports in the valve casing lies generally in a plane converging at an acute angle to a plane normal to the axis of the through-bore, the valve seat having an upper planar portion facing the other of the ports and merging into a lower portion which forms an unobstructed portion of the through-bore. This type of valve seat provides a face-seal with the resilient seal member of the gate member wedging against the upper portion, an edge-seal with the seal member engaging with the portion of the valve seat forming the through-bore and a combination face and edge-seal with the portions of the seal member engaging the portions of the seat merging from the upper planar surface to the lower portion. In machining such a valve seat in the valve casing, the seat lying in a plane at an acute angle to a plane normal to the axis of the through-bore, a maximum radial thickness is obtained in the planar surface in a vertical plane of the axis of the through-bore which bisects the planar portion. The radial thickness of the planar portion progressively decreases on both sides of the maximum radial thickness to a reduced radial thickness where the intermediate portions of the seat begin. A button-shaped tool is utilized to machine the flat face or planar surface of the seat, and it forms an outer arcuate edge in the cast material of the casing where the material falls away from the outer perimeter of the seal. Narrow corners are created at the junction points where the planar seat portion starts to merge with the intermedite portions.

The gate member for the gate valve structure of the aforementioned application includes an annular resilient seal which is generally rectangular in radial section, the annular resilient seal having a bulbous portion extending axially from the gate member for engaging the face-seat or planar portion of the valve seat, the bulbous portion of the seal member having a maximum axial thickness adjacent its upper portion in a plane extending through an axis of movement of the gate member. The bulbous portion merges into the rectangular lower portion of the seal member, the merging portions of the resilient seal member providing the combination face and edge-seal with the valve seat.

While the above-described gate valve structure of the aforementioned application Ser. No. 798,686 has proved extremely satisfactory for gate valves used in small diameter mains, difficulties have been encountered in situations where the mains are 10" in diameter or greater and the pressure of the fluid is higher. In this respect, it has been found that the bulbous portion on the seal which meets the flat machined surface at locations where it has a minimum radial thickness adjacent the narrow corners created at the junction locations, there is insufficient material in the seal member making contact when the valve is closed and leakage occurred when pressures of the fluid in the main were high.

PRIOR ART

The following patents represent prior art disclosing gare valve structures wherein the valve seat is arranged to lie generally in a plane which converges at an angle to a plane normal to the axis of the through-bore and wherein the gate member is provided with a resilient annular seal member for making a face-seal and an edge-seal with the seal further having portions making a combination face and edge-seal with the seat.

| U.S. Pat. No. | | |
|---|---|---|
| 3,957,245 | Daghe | May 18, 1976 |
| 3,963,214 | Hackman et al | June 15, 1976 |
| Foreign Patents | | |
| 1,163,626 | German | Feb. 20, 1964 |
| 1,922,516 | German | May 2, 1969 |
| 1,600,753 | German | Jan. 8, 1970 |

In addition to the above, U.S. Pat. No. 3,662,778, issued May 16, 1972, to Leopold et al, discloses a gate valve structure utilizing a face-seal merging into an edge-seal between the sealing member of the gate member and the valve seat although the valve seat does not lie generally in a plane extending at an angle to a plane normal to the axis of the through-bore.

BRIEF SUMMARY OF THE INVENTION

The gate valve structure of the present invention is primarily utilized in large diameter mains carrying fluid under high pressure, such as mains in a water distribution system. While the gate valve structure is intended to be used with the seal member of the gate member downstream of the valve seat, the design of the gate valve structure is such that it may be inserted into a main with the valve seat either positioned upstream or downstream of the gate member, there being no difference in the effectiveness of the valve. The gate valve structure may be used in other distribution systems, such as chemical, steam, gas, oil, sewage, or the like, it being understood that various parts of the gate valve structure may be made from or coated with materials to inhibit possible corrosive action within the valve structure, depending upon the type of fluid used in a particular system.

The gate valve structure of the present invention includes a valve casing having a through-bore for the flow of fluid, an elongated chamber intersecting the through-bore intermediate its ends and defining inlet and outlet ports to the chamber, and a valve seat in the casing surrounding one of the ports. The valve seat lies generally in a plane converging at an angle to a plane normal to the axis of a through-bore. The valve seat includes an arcuate upper planar portion or face-seat surface having an outer arcuate edge, the face-seat surface facing toward the other of the ports, an arcuate lower or bottom portion or edge-seat surface forming a smooth and uninterrupted portion of the through-bore, and a smooth transition portion between each end of the arcuate upper planar portion and each end of the bottom arcuate portion. A generally flat gate member reciprocates in the elongated chamber from a closed portion across the through-bore to an open position out of the through-bore. The gate member includes a body member carrying an annular resilient seal member generally rectangular in radial section, the annular seal member being arranged to form with the valve seat an arcuate upper face-seal, an arcuate lower edge-seal and intermediate portions defining a combination face and edge-seal. An arcuate bulbous portion extends axially from the upper portion of the annular seal for engaging the planar portion of the valve seat, the bulbous portion having a maximum axial thickness adjacent its upper portion in a vertical plane extending through the axis of movement of the gate member, the bulbous portion merging therefrom into the arcuate bottom portion thereof where the seal member has a minimum axial thickness. The arcuate upper bulbous portion has a pair of oppositely disposed axially extending arcuate bulges thereon at positions to engage the arcuate face-seat surface or upper planar portion of the valve seat adjacent the ends of the outer arcuate edge thereof where the face-seat surface or planar portion has a reduced radial thickness. The bulges have a greater radial thickness than the face-seat surface where they engage to provide increased contact area on and around the face-seat surface when the gate member is in the closed position, thereby providing sufficient wedging action to prevent leaks at these positions of engagement.

Another aspect of the present invention is to provide the annular seal with an axial thickness through the bulges greater than the maximum axial thickness of the arcuate bulbous portion of the seal member so that, even though the face-seat surface contacting area of the valve seat which the bulges engage is of less radial thickness than its maximum thickness at the top thereof, there is sufficient resilient material of the seal member to provide a tight seal over and around the same.

A further aspect of the present invention is to provide the bulges on the upper arcuate bulbous portion with substantially planar faces for engaging the arcuate planar portion or face-seat surface of the valve seat, thereby eliminating line contact at these positions.

A still further aspect of the present invention is to provide a gate valve structure in large diameter mains which has a valve casing which weighs less than those heretofore made for such diameter pipes and which is of less outside over-all configuration than valve casings heretofore used. This is accomplished by providing the valve casing with opposed vertical ribs in the elongated chamber of the same, the ribs being received in guideways or recesses provided in the periphery of the gate member, the ribs and guideways cooperating to guide the gate member in its movement between open and closed position. By utilizing recesses in the periphery of the gate member which extend inwardly of the outer periphery of the annular seal rather than ears extending outwardly from the gate member, the over-all width of the gate member can be reduced, thus reducing the over-all width of the valve casing as well as its weight.

These and other features and advantages of the present invention will appear more fully in the following detailed description of the invention when taken with reference to the drawings.

BRIEF DESCRIPTION OF THE DRAWINGS

FIG. 7 is an enlarged elevational view of the annular resilient seal member of the present invention;

FIG. 8 is a fragmentary side elevational view of the annular seal member taken on the line 8—8 of FIG. 7 and showing one of the bulges on the same;

FIGS. 9, 10, 11, 12 and 13 are sectional views taken respectively on the lines 9—9, 10—10, 11—11, 12—12 and 13—13 of FIG. 7;

FIG. 14 is a sectional view of the annular seal member taken on the line 14—14 of FIG. 7.

DETAILED DESCRIPTION OF THE INVENTION

Figure 1:
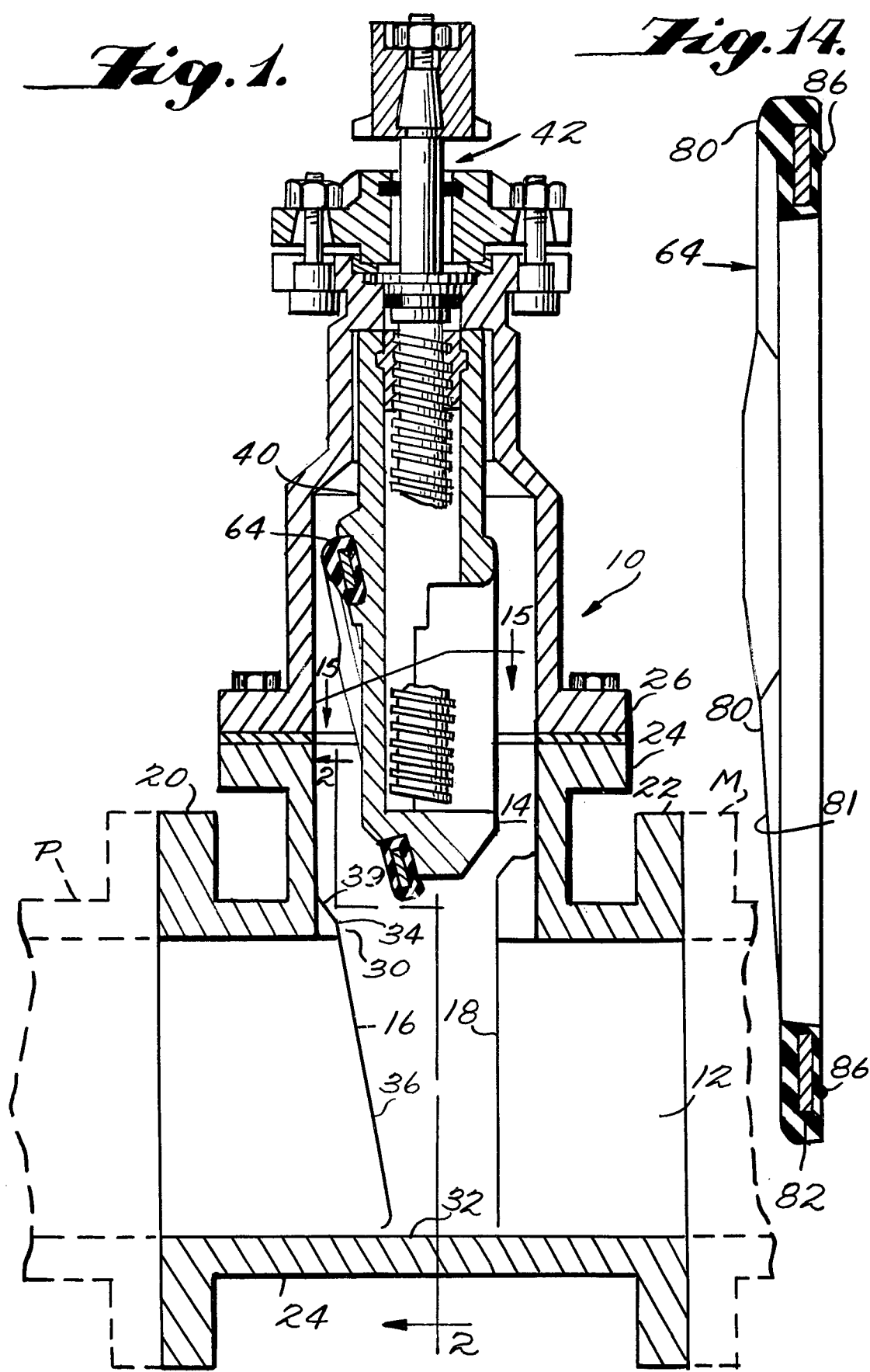
FIG. 1 is a vertical sectional view through the gate valve structure of the present invention taken on a plane parallel to the through-bore of the same and illustrating the gate member in the opened position, the valve stem mechanism being partially shown in elevation.

Referring now to the drawings wherein like characters or reference numerals represent like or similar parts, the gate valve structure of the present invention is generally illustrated in FIG. 1. In more detail, the gate valve structure includes a valve casing generally designated at 10, the valve casing being provided with a through-bore 12, an elongated chamber 14 intersecting the through-bore 12 and defining ports 16 and 18 in the through-bore, and flanges 20 and 22 arranged to receive suitable means for attaching the gate valve structure to the pipes or mains P and M, respectively, shown in broken lines. The ports 16 and 18 may be inlet or outlet ports to the chamber 14 depending upon which way they gate valve structure is inserted into the fluid distribution system since the gate valve structure is a twoway structure not affected by the pressure of the fluid upon opening and closing of the valve structure.

The valve casing 10 is of the conventional type including a lower body member 24 and a bonnet 26 attached thereto, and as fully disclosed in the aforementioned application Ser. No. 798,686, and to this extent the aforementioned application is incorporated herein by reference.

Figure 2:
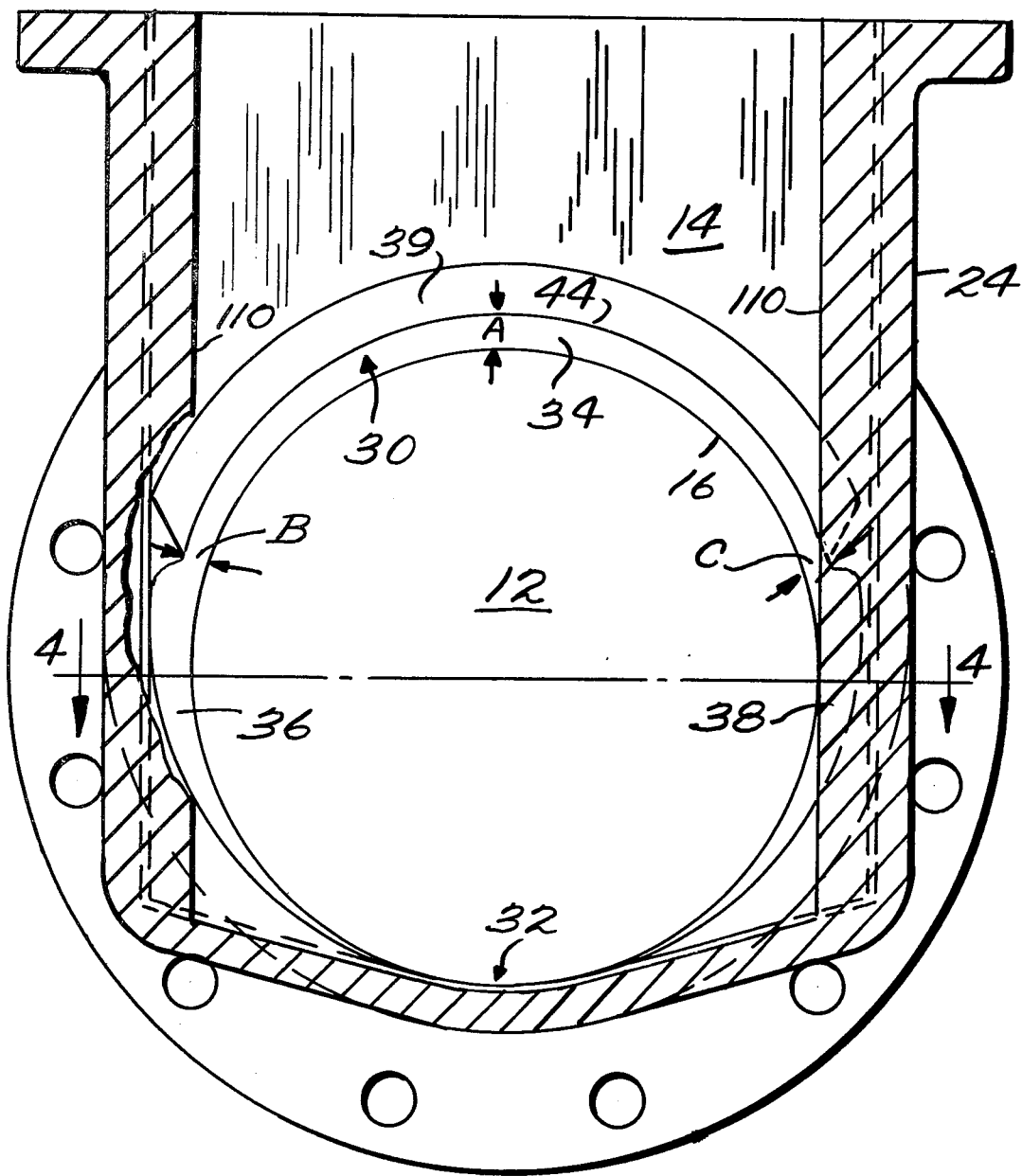
FIG. 2 is an enlarged vertical sectional view through the lower body member of the valve casing, the view being taken substantially on the line 2—2 of FIG. 1 or 2—2 of FIG. 3.
Figure 3:
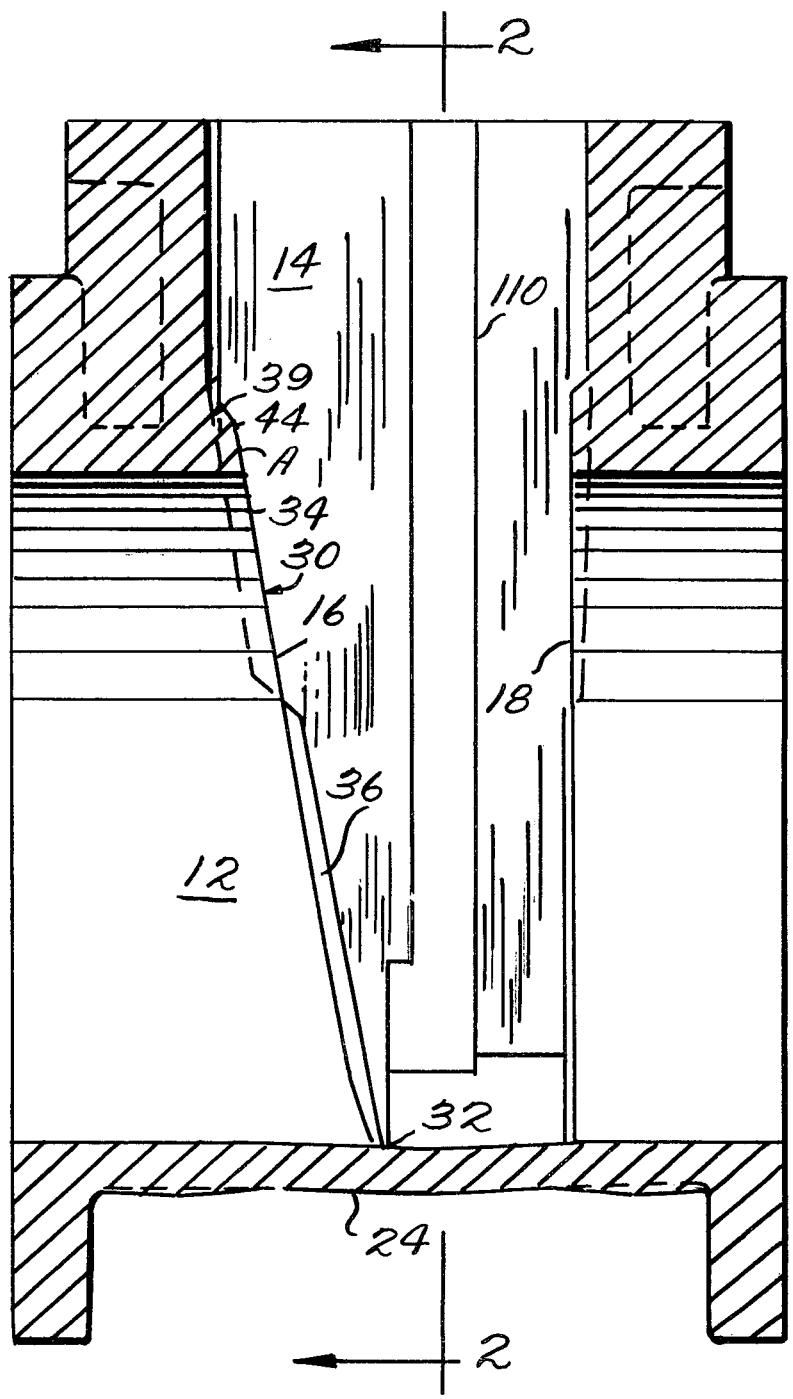
FIG. 3 is an enlarged vertical sectional view of the lower body member of the valve casing of FIG. 1, the view omitting the gate member.
Figure 4:
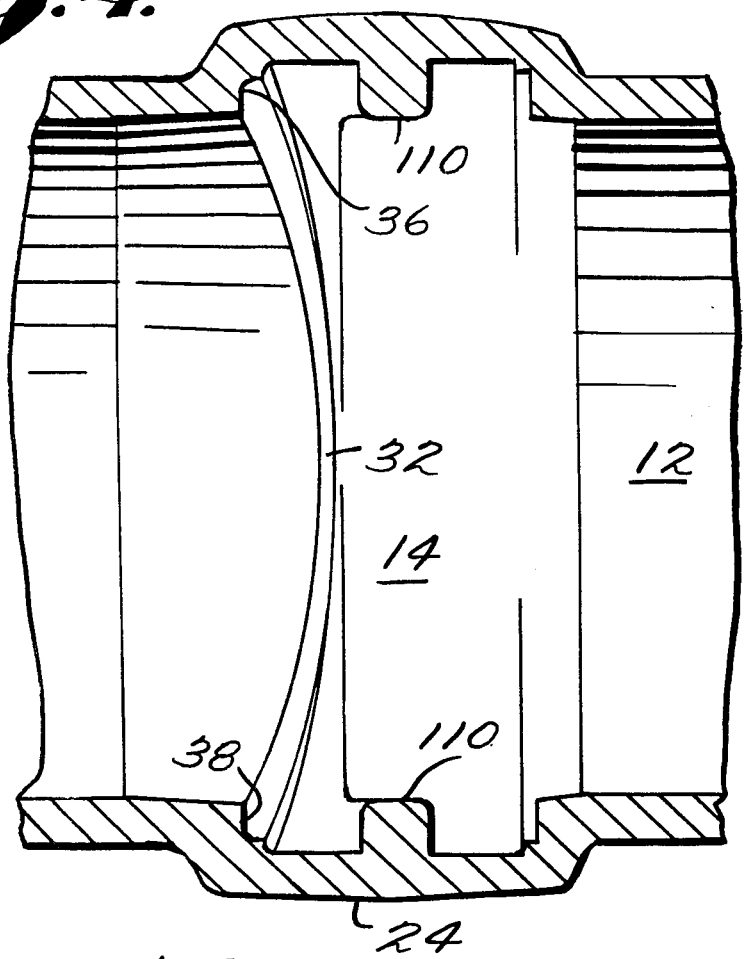
FIG. 4 is an enlarged sectional view taken on the line 4—4 of FIG. 2.

A valve seat 30, as best shown in FIGS. 2, 3 and 4, surrounds the port 16 of the through-bore 12 at a position where the through-bore is intersected by the chamber 14, the valve seat smoothly merging with the bottom portion of the through-bore, as indicated at 32. Thus, it will be noted that the through-bore 12 has its bottom portion through its entire length completely unobstructed with no bottom cavity for receiving the gate member and for causing turbulence in the flow through the valve structure when the valve is opened. A more detailed description of the valve seat will follow later in the specification.

Cooperating with the valve seat 30 is a gate or disc member 40 which is best shown in FIGS. 1, 5, 6 and 15. The disc member 40 is reciprocated in the chamber 14 from an opened position (as shown in FIG. 1) to a closed position (not shown) by valve stem operating means 42. The valve stem operating means 42 may be of the non-rising stem type or of the rising stem type, if so desired. As shown, the valve stem operating means 42 is of the non-rising stem type such as disclosed in the aforementioned application Ser. No. 798,686, and to that extent the disclosure in the application is incorporated by reference herein.

Referring back to the description of the valve seat 30, it is generally similar to the valve seat disclosed in application Ser. No. 798,686, and it includes an arcuate upper planar portion 34 which faces the port 18. The planar portion 34 defines a face-seat surface, and it lies in a plane extending generally at an acute angle to a plane normal to the axis of the through-bore 12 and preferably the angle is approximately 10 degrees. The arcuate planar portion 34 has a maximum radial thickness A at a position intermediate its ends, the thickness A lying in a vertical plane through the axis of the through-bore. The arcuate planar portion 34 progressively decreases in radial thickness from its maximum radial thickness at A to a reduced radial thickness at the positions indicated at B and C. At the positions B and C, the valve seat 30 is provided with transition portions 36 and 38 extending from ends of planar portion 34 and merging smoothly into the arcuate bottom portion 32. The transition portions 36 and 38 define areas in the valve seat where a combination face-edge seat surface is provided, whereas the arcuate bottom portion 32 defines an edge-seat surface.

It will be noted that the entire valve seat 30 lies generally in a plane extending at an acute angle to a plane normal of the axis of the through-bore 12, although the bottom arcuate portion 32 of the valve seat actually is an edge-seat surface. As best shown in FIGS. 2 and 3, the wall surface which surrounds the outer periphery of the arcuate planar portion 34 is recessed sharply away from the plane of the valve seat by an angle of approximately 60 degrees, this recess being identified by the numeral 39. When the lower body member 24 of the valve housing is cast, the recess 39 is provided in the casing, and when the valve seat 30 is machined, and particularly when the arcuate planar upper portion 34 is machined by a button-shaped tool to cut the flat face surface thereof, an outer arcuate edge 44 is formed, the edge 44 terminating at ends where the arcuate planar portion 34 has a reduced radial thickness as indicated at B and C. It is at the positions B and C where problems of leakage develop in the gate valve structure shown in application Ser. No. 798,686 unless excessive torque is used on the valve operating means 42. The recessed portion 39 in the lower body means 24 of the valve casing functions similarly to that recess disclosed in the afore-mentioned application Ser. No. 798,686, and the description therein of the function is incorporated herein.

Figure 15:
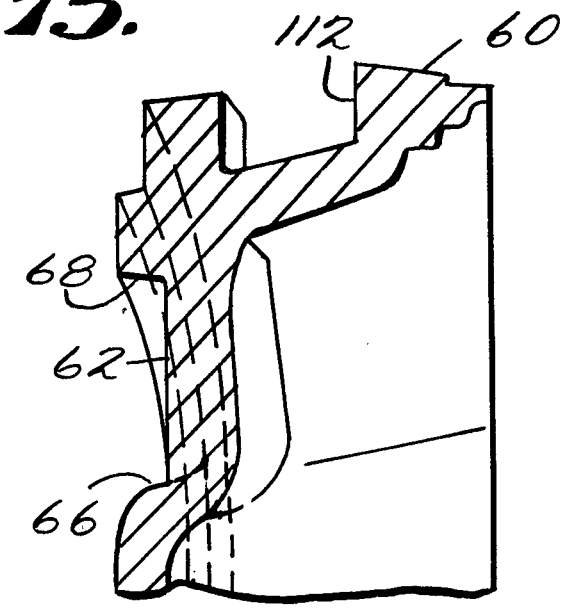
FIG. 15 is a fragmentary sectional view of the gate member taken on the line 15—15 of FIG. 1, the annular resilient seal and valve stem being omitted for the purpose of clarity.
Figure 5:
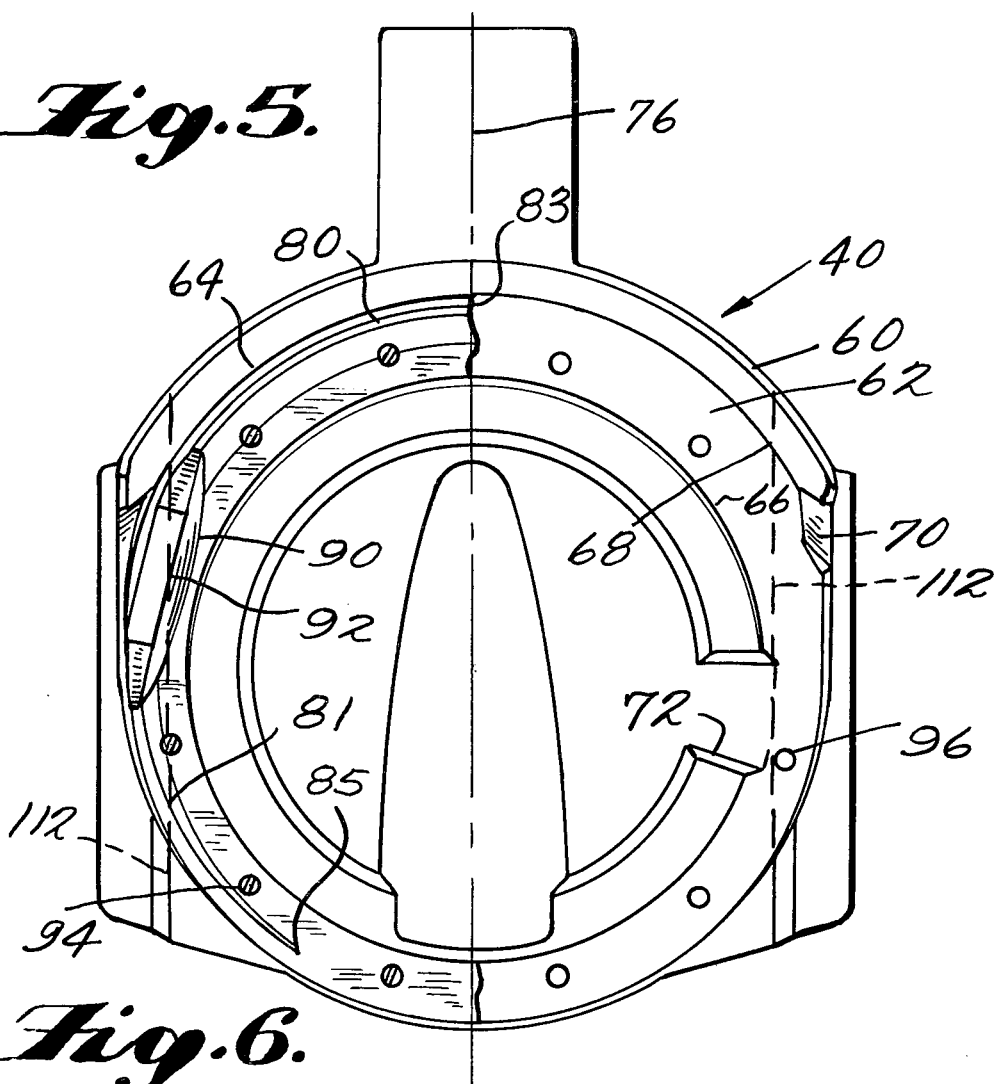
FIG. 5 is an enlarged side elevational view of the gate member with a portion of the annular resilient seal member broken away.
Figure 6:
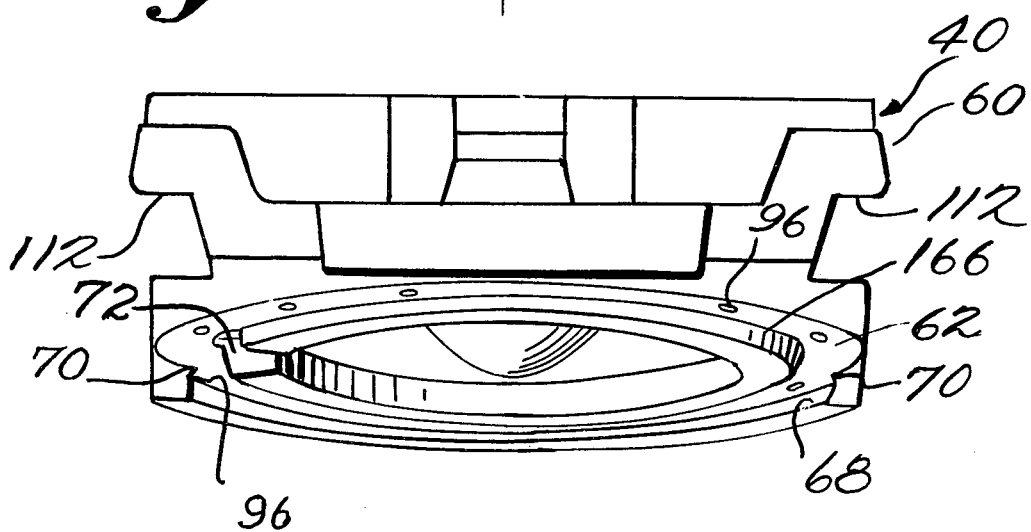
FIG. 6 is a bottom plan view of the gate member of FIG. 5 but rotated substantially 180°, the view omitting the annular resilient seal member.

The gate member 40 is best shown in FIGS. 5, 6 and 15, and it will be noted that it includes a cast body member 60 which is provided with an annular planar surface 62 for receiving an annular resilient seal member 64. In more detail, the annular planar surface 62 is provided about its radial inner periphery with an annular shoulder 66, the shoulder extending generally normal to the planar surface 62 in a generally axial direction from the body member 60. A further arcuate shoulder 68 is provided about a portion of the radial outer periphery of the planar surface 62 adjacent the top portion thereof, the shoulder 68 also extending generally normal to the planar surface 62 in a generally axial direction from the body member 60. As will be appreciated by reference to FIG. 1, the planar surface 62 lies in a plane extending at an acute angle to a plane normal to the axis of the through-bore 12 of the body member 22 of valve casing 10, and is generally parallel to the plane of the valve seat 30.

The shoulders 66 and 68 function to retain the seal member 64 on the body member 60, the shoulder 66 restraining the radial inner periphery or edge of the seal member 64, whereas the shoulder 68 restrains only the upper portion of the outer radial periphery or edge of the seal member 64 at a position where the face-seal is made between the seal member and the valve seat 30. The planar surface 62 of the body member 40 is provided with oppositely disposed recesses 70 at the circumferential ends of the arcuate shoulder 68. The gate member 40 thus far described is substantially similar to that disclosed in the aforementioned application Ser. No. 798,686, and the disclosure therein and functions of the various elements are incorporated herein by reference.

Referring now to FIGS. 5 and 7-14, inclusive, the annular resilient seal member 64 which is made from an elastomeric material, such as rubber, synthetic rubber or a rubber-like material, is provided with a radially inwardly projecting tab 74 which is arranged to be received in a recess 72 provided in the annular shoulder 66 of the body member 60. By such an arrangement, the seal member 64 is properly oriented on the body member 60 of the gate member 40 when the same is assembled.

As heretofore described in application Ser. No. 798,686, the annular seal member 64 is generally rectangular in radial section, but it has an annular bulbous portion extending axially therefrom, the bulbous portion being identified by the numeral 80. The bulbous portion 80 extends about the upper half of the seal member 64 and then it begins to flatten and merge into the rectangular-shaped lower portion of the seal member 64, as indicated at 81. The maximum axial thickness of the bulbous portion 80, when the seal member is mounted onto the planar surface 62 of the body member 60, lies in a plane through the vertical axis 76 of the body member 60. From this point 83, where the bulbous portion has a maximum axial thickness, the bulbous portion 80 decreases in radial thickness as it extends circumferentially on both sides of the point 83 to a point 85 where it merges into the generally rectangular radial section of the seal member 64.

A pair of oppositely disposed arcuate bulges 90 are provided on the arcuate upper bulbous portion 80 of the seal member 64 at positions where they are arranged to engage the planar seal portion 34 at its reduced radial thicknesses B and C. The bulges 90 have a planar face 92 which has a greater radial thickness than the face-seat surface or planar portion 34 of the valve seat 30 so as to provide increased contact area when the gate member 40 is in the closed position. Additionally, it will be noted that the bulges 90 (FIG. 10) have an axial thickness through their planar face 92 which is greater than the maximum thickness of the bulbous portion 83 of the annular seal member 64.

The annular seal member 64 is supported on the body member 60 by means of a plurality of circumferentially spaced bolts 94 extending through holes 95 in the seal member and threadedly received in the bolt holes 96 in the body member 60 in a similar fashion to that disclosed in the aforementioned application Ser. No. 798,686 except that no holes are provided in the seal member in the immediate area of the bulges 90. Additionally, the annular seal member 64 is provided with a reinforcing ring 82 embedded therein and an annular bead 86 just as disclosed in the aforementioned application Ser. No. 798,686.

By providing the bulges 90 at the positions where they will engage the valve seat 30 adjacent the reduced radial thickness B and C of the planar portion 34, more contact area is realized and, consequently, it requires less torque to close the valve for a specific pressure of the fluid in the pipes or mains P and M. In this respect, tests have been conducted comparing the torque applied to the stem nut of the stem operating means 42 for a 12" gate valve of the type disclosed in application Ser. No. 798,686, the annular seal member having 12 bolt holes therein, with a gate valve of the present invention utilizing an annular seal member 64 with 12 bolt holes and opposed bulges 90. A further test comparing the gate valve structure of the present invention utilizing an annular seal 64 with the opposed bulges 90 but only 10 bolt holes in the seal member with none of the bolt holes in the area of the bulges, was also conducted. The results of the pressure leakage data test is disclosed in the table below, and it will be noted that the pressure was applied from the seat side of the valve casing.

| PRESSURE LEAKAGE DATA - 12" R.S.G.V. (Pressure Applied From Seat Side of Body) | | |
|---|---|---|
| Stem Nut Torque in lbs. | Seal Style | Maximum Water Pressure PSIG |
| 4500 | Seal of Appln. S.N. 798,686 (12 bolt holes) | 150 |
| 6175 | Seal of Appln. S.N. 798,686 (12 bolt holes) | 350 |
| 3600 | Present Seal with bulges and 12 bolt holes | 150 |
| 4200 | Present Seal with bulges and 12 bolt holes | 200 |
| 2400 | Present Seal with bulges and 10 bolt holes | 150 |
| 2800 | Present Seal with bulges and 10 bolt holes | 260 |
| 3600 | Present Seal with bulges and 10 bolt holes | 350 |

-continued

| PRESSURE LEAKAGE DATA - 12" R.S.G.V. (Pressure Applied From Seat Side of Body) | | |
|---|---|---|
| Stem Nut Torque in lbs. | Seal Style | Maximum Water Pressure PSIG |

From the above tests, it will be noted that when a valve is tested at 150 pounds per square inch gauge (PSIG), and utilizing the annular seal of application Ser. No. 798,686, it requires 4500 torque inch pounds to be applied to the stem operating means to prevent any leaks, but when utilizing the annular seal member of the present invention with the two bulges thereon and the same number of bolt holes, it requires only 3600 torque inch pounds to make an adequate seal. Further, by reducing the number of bolt holes in the annular seal so that no bolt hole is in the area of the two bulges, the torque required to provide an adequate seal drops off even further to 2400 inch pounds. By reducing the torque required to adequately close the valve, less damage results to the annular seal member over a period of use of the gate valve structure.

Referring to FIGS. 2, 3 and 4, it will be noted that the lower body member 24 of the valve casing 10 is provided with a pair of oppositely disposed inwardly and vertically extending ribs 110 in the chamber 14. The body member 60 of gate member 40 is cast with a pair of oppositely disposed recesses of guideways 112 for receiving the ribs 110. The ribs 110 and the guideways 112 cooperate to guide the gate member 40 when moved between the opened and closed positions. By such an arrangement, the width of the valve casing 24 may be materially reduced from that where the gate member is provided with ears projecting outwardly beyond the same and, consequently, the amount of material used in the valve casing is less, thus reducing its weight and cost.

The terminology used throughout this specification is for the purpose of description and not limitation, the scope of the invention being defined in the appended claims.

What is claimed is:

1. A gate valve structure for use in mains carrying a fluid, said gate valve structure comprising:
   a valve casing having a through-bore for the flow of fluid, an elongated chamber intersecting said through-bore intermediate its ends and defining inlet and outlet ports to the chamber, and a valve seat in said casing surrounding one of said ports, said valve seat lying generally in a plane which converges at an acute angle to a plane normal to the axis of the through-bore, said valve seat further having an upper arcuate planar portion facing toward the other of said ports to define a face-seat surface having an outer arcuate edge, the face-seat surface having a maximum radial thickness intermediate the ends of said arcuate edge and progressively reducing in radial thickness to a minimum radial thickness adjacent the ends of said outer arcuate edge, a bottom arcuate portion forming a smooth and uninterrupted portion of said through-bore to define an edge-seat surface, and a smooth transition portion between each end of said upper arcuate planar portion and each end of said bottom arcuate portion to define a combination face-edge-seat surface;

a generally flat gate member reciprocal in said elongated chamber from a closed position across said through-bore and seating against said valve seat to an open position out of said through-bore, said gate member including a body member having an annular planar surface lying in a plane generally parallel to the plane of said valve seat, an annular resilient seal member supported on said planar surface of said body member, said annular seal member being generally rectangular in radial section and having an arcuate upper bulbous portion extending axially therefrom for engaging the upper portion of said valve seat to form a face seal therewith, said arcuate bulbous portion of said seal member, when relaxed, having a maximum axial thickness adjacent its upper portion in a plane extending through an axis of movement of said gate member, said annular resilient seal further having a bottom arcuate portion of uniform minimum axial thickness for engaging said bottom arcuate portion of said valve seat to form an edge seal therewith, said arcuate upper bulbous portion merging into said bottom arcuate portion of said seal member to form intermediate portions for engaging each transition portion of said valve seat to form a combination face-edge seal, and said arcuate upper bulbous portion having a pair of oppositely disposed axially extending arcuate bulges thereon at positions to engage said face-seat surface adjacent the ends of the outer arcuate edge where said face-seat surface has a reduced radial thickness, said bulges having a greater radial thickness than the face-seat surface where they engage to provide increased contact area when the gate member is in the closed position; and valve stem means operatively connected to said gate member and extending through said casing for moving said gate member between the closed and open positions.

2. A gate valve structure as claimed in claim 1 in which said annular seal has an axial thickness through said bulges greater than the maximum axial thickness of said arcuate bulbous portion of said seal member.

3. A gate valve structure as claimed in claim 1 in which said bulges on the arcuate upper bulbous portion have a substantially planar face for engaging the face-seat surface of said valve seat.

4. A gate valve structure as claimed in claim 3 wherein said annular seal has an axial thickness through said bulges greater than the maximum axial thickness of said arcuate bulbous portion of said seal member.

5. A gate valve structure as claimed in claim 4 wherein the bulbous portion intermediate said pair of oppositely disposed bulges is provided with a rounded surface facing said face-seat surface for engaging the same.

6. A gate valve structure as claimed in claim 5 in which said arcuate upper bulbous portion merges into said bottom arcuate portion beneath said pair of oppositely disposed bulges to provide a transitional surface for said combination face-edge seal.

7. A gate valve structure as claimed in claim 1 wherein the bulbous portion intermediate said pair of oppositely disposed bulges is provided with a rounded surface facing said face-seat surface for engaging the same.

8. A gate valve structure as claimed in claim 1 in which said arcuate upper bulbous portion merges into said bottom arcuate portion beneath said pair of oppositely disposed bulges to provide a transitional surface for said combination face-edge seal.

9. A gate valve structure as claimed in claim 1 in which said planar surface of said body member is surrounded on its radially outer periphery adjacent its upper portion by an arcuate shoulder terminating in circumferentially spaced ends and extending axially from said body member, said planar surface being further provided on its radially inner periphery by an annular shoulder extending axially from said body member, said annular resilient seal member being received on said planar surface and bounded by the annular shoulder and the arcuate shoulder with the ends of the arcuate shoulder terminating radially outwardly of said oppositely dispoed bulges.

10. A gate valve structure as claimed in claim 9 in which said body member of said gate member includes means to accommodate flow of the bulges of said seal member in an area adjacent the circumferential ends of said arcuate shoulder, said means including recesses in said planar surface of the body member at the ends of said arcuate shoulder.

11. A gate valve structure as claimed in claim 1 in which said valve casing is provided with a pair of opposed vertically extending ribs in said elongated chamber and in which said body member of said gate member is provided with a pair of oppositely disposed recesses in its periphery for receiving said ribs, said ribs and said recesses cooperating to guide said gate member during opening and closing of the same.

* * * * *